US012666434B2

(12) United States Patent
Liu et al.

(10) Patent No.: US 12,666,434 B2
(45) Date of Patent: Jun. 23, 2026

(54) DOWNLINK CONTROL INFORMATION DCI TRANSMISSION METHOD AND COMMUNICATION DEVICE

(71) Applicant: VIVO MOBILE COMMUNICATION CO., LTD., Dongguan (CN)

(72) Inventors: Siqi Liu, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 806 days.

(21) Appl. No.: 17/964,494

(22) Filed: Oct. 12, 2022

(65) Prior Publication Data

US 2023/0032391 A1 Feb. 2, 2023

Related U.S. Application Data

(63) Continuation of application No. PCT/CN2021/087736, filed on Apr. 16, 2021.

(30) Foreign Application Priority Data

Apr. 17, 2020 (CN) .......................... 202010307025.1

(51) Int. Cl.
*H04W 72/23* (2023.01)

(52) U.S. Cl.
CPC .................................. *H04W 72/23* (2023.01)

(58) Field of Classification Search
CPC ..................................................... H04W 72/23
See application file for complete search history.

(56) References Cited

U.S. PATENT DOCUMENTS

| | | | |
|---|---|---|---|
| 8,958,366 B2 | 2/2015 | Heo et al. | |
| 10,512,072 B2 | 12/2019 | Yi et al. | |
| 10,624,076 B2 | 4/2020 | Kim et al. | |
| 10,750,490 B2 | 8/2020 | Wang et al. | |
| 2019/0191424 A1 | 6/2019 | Wang et al. | |

FOREIGN PATENT DOCUMENTS

| | | | |
|---|---|---|---|
| CN | 102859956 A | 1/2013 | |
| CN | 106165510 A | 11/2016 | |
| CN | 108616840 A | 10/2018 | |
| CN | 109565488 A | 4/2019 | |
| EP | 3509379 A1 | 7/2019 | |
| EP | 3920635 A1 * | 12/2021 | ............ H04W 72/23 |
| EP | 3944694 A1 | 1/2022 | |

(Continued)

OTHER PUBLICATIONS

Supplementary European Search Report regarding European Patent Application No. 21787771.1-1203, dated Jul. 27, 2023.

(Continued)

*Primary Examiner* — Samina F Choudhry
(74) *Attorney, Agent, or Firm* — Harness, Dickey & Pierce, P.L.C.

(57) ABSTRACT

A DCI transmission method, includes: obtaining a first bit number of first DCI, where the first DCI is SL DCI; determining a third bit number of the first DCI according to the first bit number and a second bit number of second DCI; and performing transmission of the first DCI according to the third bit number.

19 Claims, 2 Drawing Sheets

(56)  References Cited

FOREIGN PATENT DOCUMENTS

KR      1020190013539  A      2/2019
WO      WO-2018133001  A1  *   7/2018   ..............  H04L  1/00

OTHER PUBLICATIONS

Discussion on resource allocation for NR sidelink Mode 1, LG Electronics, 3GPP TSG RAN WG1 #98 Meeting, R1-1908901, dated Aug. 30, 2019.
"Support of NR Uu controlling LTE sidelink," vivo, 3GPP TSG RAN WG1 Meeting #99, R1-1912028, dated Nov. 22, 2019.
Request for the Submission of an Opinion issued in KR 10-2022-7039433, dated Feb. 20, 2025; 13 pages.
International Search Report and Written Opinion of the International Searching Authority regarding International Patent Application No. PCT/CN2021/087736, dated Jul. 8, 2021. Translation provided by Bohui Intellectual Property.
"Remaining details on mode-1 resource allocation," Futurewei, 3GPP TSG RAN WG1 Meeting #100-e, R1-2000565, dated Mar. 6, 2020.
"Discussion on NR sidelink resource allocation for Mode 1," LG Electronics, 3GPP TSG RAN WG1 #99 Meeting, R1-1912587, dated Nov. 22, 2019.

* cited by examiner

DOWNLINK CONTROL INFORMATION DCI TRANSMISSION METHOD AND COMMUNICATION DEVICE

CROSS-REFERENCE TO RELATED APPLICATIONS

This application is a Bypass Continuation Application of PCT/CN2021/087736, filed on Apr. 16, 2021, which claims priority to Chinese Patent Application No. 202010307025.1, filed on Apr. 17, 2020, which are incorporated herein by reference in their entirety.

TECHNICAL FIELD

The present disclosure relates to the field of communication technologies, and in particular, to a DCI transmission method and communication device.

BACKGROUND

In a new radio (NR) V2X system, two resource allocation modes are supported, which are respectively a scheduled resource allocation mode and an autonomous resource selection mode. The scheduled resource allocation mode is usually referred to as a mode-1. In the scheduled resource allocation mode, a network device usually controls and allocates a resource for each terminal. In the autonomous resource selection mode, the terminal autonomously selects the resource.

SUMMARY

Embodiments of the present disclosure provide a DCI transmission method and a communication device.

According to a first aspect, an embodiment of the present disclosure provides a DCI transmission method, the method including:

obtaining a first bit number of first DCI, where the first DCI is sidelink downlink control information SL DCI;

determining a third bit number of the first DCI according to the first bit number and a second bit number of second DCI; and performing transmission of the first DCI according to the third bit number.

According to a second aspect, an embodiment of the present disclosure provides a communication device, the communication device including:

an obtaining module, configured to obtain a first bit number of first DCI, where the first DCI is sidelink downlink control information SL DCI;

a determining module, configured to determine a third bit number of the first DCI according to the first bit number and a second bit number of second DCI; and a transmission module, configured to perform transmission of the first DCI according to the third bit number.

According to a third aspect, an embodiment of the present disclosure provides a communication device, the communication device including: a memory, a processor, and a program stored in the memory and executable on the processor, where the program, when executed by the processor, implements the steps of the foregoing DCI transmission method.

According to a fourth aspect, an embodiment of the present disclosure provides a non-transitory computer-readable storage medium, storing a computer program, the computer program, when executed by a processor, implementing the operations in the foregoing DCI transmission method.

According to a fifth aspect, an embodiment of the present disclosure provides a computer program product stored in a non-transitory computer-readable storage medium, the computer program product being executed by at least one processor to implement the steps of the foregoing DCI transmission method.

According to a sixth aspect, an embodiment of the present disclosure provides a communication device, the communication device being configured to perform the steps of the foregoing DCI transmission method.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION

The following clearly describes the technical solutions in embodiments of the present disclosure with reference to the accompanying drawings in the embodiments of the present disclosure. Apparently, the described embodiments are some of the embodiments rather than all of the embodiments of the present disclosure. All other embodiments derived by a person of ordinary skill in the art based on the embodiments of the present disclosure shall fall within the protection scope of the present disclosure.

In addition, the terms "include" and any variant thereof in the description and claims of this disclosure are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

According to the embodiments of the present invention, a first bit number of first DCI is obtained; a third bit number of the first DCI is determined according to the first bit number and a second bit number of second DCI; and transmission of the first DCI is performed according to the third bit number. In the embodiments of the present invention, a method for determining a bit number of SL DCI is defined, thereby keeping understanding of the network device and the terminal consistent.

In addition, in the embodiments of the present disclosure, the word "exemplary" or "for example" is used to represent giving an example, an illustration, or a description. Any embodiment or design scheme described as "exemplary" or "for example" in the embodiments of the present disclosure should not be construed as being preferred or superior to other embodiments or design schemes. Exactly, use of the term, such as "exemplarily" or "for example", is intended to present a related concept in a specific manner.

The following describes the embodiments of the present disclosure with reference to the accompanying drawings. A DCI transmission method and a communication device provided in the embodiments of the present disclosure are applicable to a wireless communication system. The wireless communication system may be a 5G system, an evolved long term evolution (eLTE) system, or a subsequent evolved communication system.

Figures 1, 2, 3:
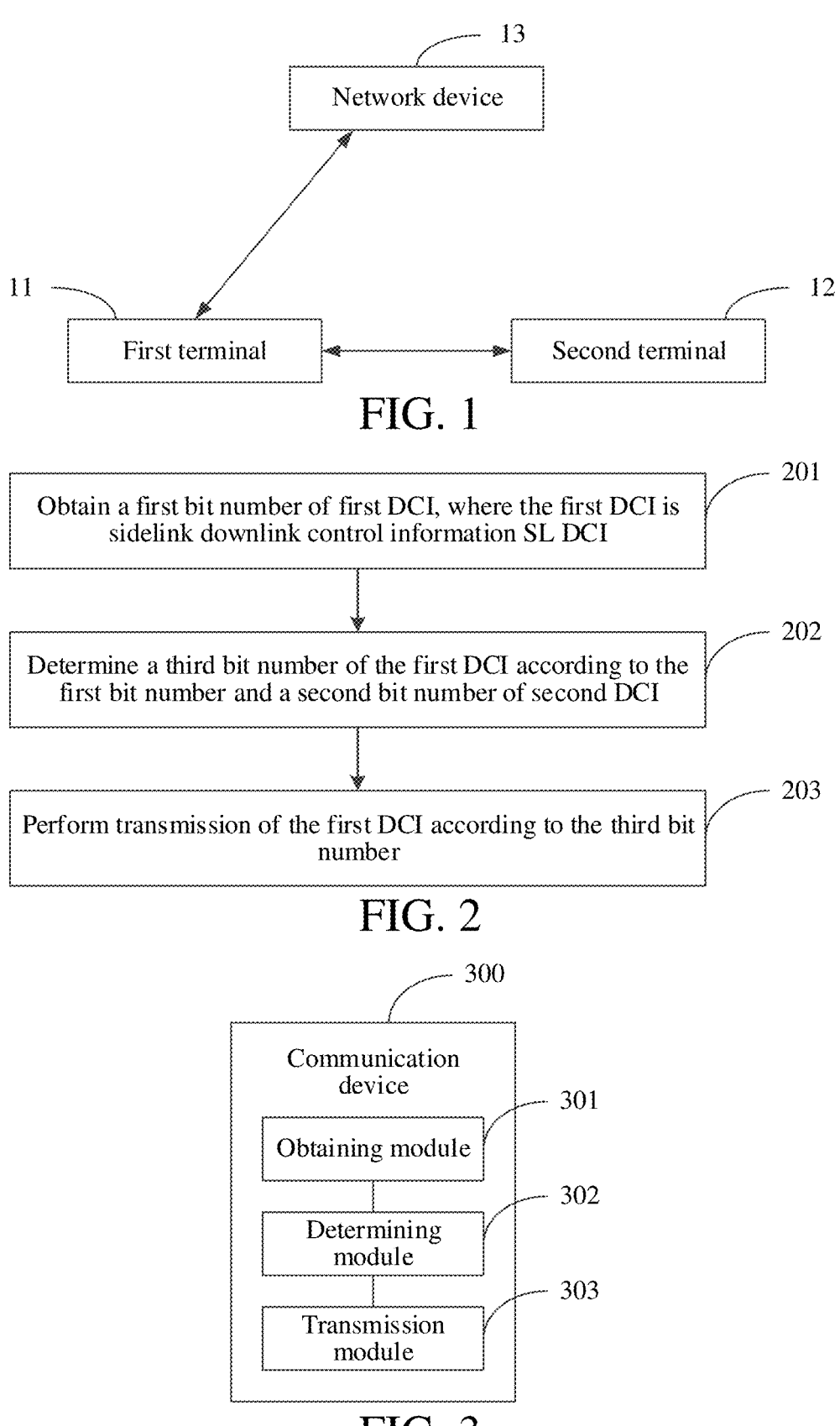
FIG. 1 is a structural diagram of a network system to which an embodiment of the present disclosure is applicable.
FIG. 2 is a flowchart of a DCI transmission method according to an embodiment of the present disclosure.
FIG. 3 is a first structural diagram of a communication device according to an embodiment of the present disclosure.

FIG. 1 is a structural diagram of a network system to which an embodiment of the present disclosure is applicable. As shown in FIG. 1, the network system includes a first terminal 11, a second terminal 12, and a network device 13. The first terminal 11 and the second terminal 12 may be user terminals or other terminal side devices, for example, terminal side devices such as a mobile phone, a tablet personal computer, a laptop computer, a personal digital assistant (PDA), a mobile internet apparatus (MID), a wearable device, a vehicle or a road side unit (RSU). It needs to be noted that, in the embodiments of the present disclosure, specific types of the first terminal 11 and the second terminal 12 are not limited. The network device may be a 5G base station, or a base station of a later version, or a base station in another communications system, or referred to as a node B, an evolved node B, or a transmission reception point (TRP), or an access point (AP), or another word in the field. As long as the same technical effect is achieved, the network device is not limited to a specific technical word. In addition, the network device may be a master node (MN) or a secondary node (SN). It needs to be noted that, only a 5G base station is used as an example in the embodiments of the present disclosure, but a specific type of the network device is not limited.

Optionally, in FIG. 1, for sidelink transmission from the first terminal 12 to the second terminal 13, the first terminal 11 is a transmitter or a transmission terminal of the sidelink transmission, and the second terminal 12 is a receiver or a receiving terminal of the sidelink transmission. Certainly, in other sidelink transmission, the first terminal 12 may also serve as a receiver or a receiving terminal of the other sidelink transmission.

For ease of understanding, some content related to the embodiments of the present disclosure are described below.

I. NR Uu.

A plurality of DCI formats are defined in NR, and are used for different purposes, such as data scheduling, resource preemption, slot format notification, and uplink power control. Optionally, according to types of DCI, the DCI formats may be divided into: fallback DCI, non-fallback DCI, and group-common DCI.

The Fallback DCI is usually used for scheduling a public message, and mainly for some basic functions. A size range of the Fallback DCI is relatively fixed.

The Non-Fallback DCI is usually used for scheduling user-specific information. A size of the Non-Fallback DCI varies greatly, and the size of the Non-Fallback DCI depends on a function supported by a current system. If a certain system provides few functions, the size of the Non-Fallback DCI may be very small. If this system provides many functions, the size of the Non-Fallback DCI is very large.

The Group-common DCI controls a group of users at the same time, and a size controlled at the same time is relatively fixed, which mainly depends on a number of users in a user group controlled by the DCI that is configured by radio resource control (RRC).

The Group-common DCI may be divided into 0-x, 1-x, and 2-x according to format names of the DCI, where x is a natural number. A DCI format of 0-x is used for uplink scheduling, a DCI format of 1-x is used for downlink scheduling, and a DCI format of 2-x is used for group control.

In addition, a new DCI format 0-2 is also introduced into ultra-reliable and low latency communications (URLLC). The new DCI format 0-2 is more flexible than 0-1, and has more configurable domains whose sizes may be flexibly configured.

II. A Number of DCI Sizes.

As mentioned above, different DCI formats carry different bit numbers, and may have different sizes. Because a user can only perform blind detection when detecting, a larger size of a DCI format indicates higher complexity of the user. In order to limit the complexity of the user and reduce power consumption of the user, NR R15 agrees that, in a scheduled cell, a DCI size corresponding thereto cannot exceed 4. A DCI size scrambled by a user-specific radio network temporary identifier (RNTI) cannot exceed 3, and the RNTI may be a cell-radio network temporary identifier (C-RNTI). The DCI size may also be referred to as a bit number of DCI.

For example, if a cell 1 schedules the cell 1 and a cell 2 at the same time, in this case, although transmission of all DCI is performed on the cell 1, because a number of DCI sizes is defined according to a scheduled cell, it is enough that respectively corresponding DCI sizes from perspectives of the cell 1 and the cell 2 are no more than 4, that is, at most 8 pieces of DCI with different sizes may be detected on the cell 1.

FIG. 2 is a flowchart of a DCI transmission method according to an embodiment of the present disclosure. The method is performed by the communication device, and as shown in FIG. 2, includes the following steps:

step 201, obtain a first bit number of first DCI, where the first DCI is sidelink downlink control information SL DCI;

step 202, determine a third bit number of the first DCI according to the first bit number and a second bit number of second DCI;

step 203, perform transmission of the first DCI according to the third bit number.

The communication device to which the DCI transmission method provided in the embodiments of the present disclosure is applied may be a network device, a terminal, or a user. When the method is performed by the network device, the performing transmission of the first DCI according to the third bit number may be understood as: sending the first DCI according to the third bit number. When the method is performed by the terminal, the performing transmission of the first DCI according to the third bit number may be understood as: receiving the first DCI according to the third bit number.

The first bit number may be understood as a bit number of the first DCI calculated according to a function provided by the system, and the third bit number is a bit number of the first DCI when transmission of the first DCI is finally performed. The second DCI is DCI other than the first DCI configured by the network device for the terminal. The bit number of the first DCI may be understood as a bit number of an information bit or a bit number of an effective bit of the first DCI. The SL DCI refers to DCI for scheduling or activating an SL resource, or deactivating the SL resource, such as at least one of a DCI format 3-0 or a DCI format 3-1.

According to the embodiments of the present disclosure, a first bit number of first DCI is obtained; a third bit number of the first DCI is determined according to the first bit number and a second bit number of second DCI; and transmission of the first DCI is performed according to the third bit number. In the embodiments of the present disclosure, a method for determining a bit number of SL DCI is defined, thereby keeping understanding of the network device and the terminal consistent.

It should be understood that the second DCI includes target DCI in Uu DCI corresponding to a first object.

In the present disclosure, the Uu DCI may be understood as DCI for controlling Uu interface transmission, and may include fallback DCI, non-fallback DCI, group-common DCI, and the like. The Uu DCI may also be divided into DCI scrambled by common RNTI (for example, SI-RNTI, P-RNTI, and RAR-RNTI), DCI scrambled by group RNTI (for example, at least one of SFI-RNTI, or TPC-RNTI), and DCI scrambled by dedicated RNTI (for example, at least one of C-RNTI, CS-RNTI, MCS-RNTI, SL-RNTI, or SL-CS-RNTI). In the present disclosure, for ease of calling, the fallback DCI may be referred to as FB DCI, the non-fallback DCI may be referred to as NFB DCI, the group-common DCI may be referred to as GC DCI, and DCI scrambled by the dedicated RNTI may be referred to as dedicated Uu DCI.

The target DCI corresponding to the first object may be understood as the following: transmission of the target DCI is performed on the first object, or the first object is scheduled by the target DCI. In other words, the first object is an object that is scheduled by the target DCI, or an object that schedules the SL resource. For example, the transmission of the target DCI is performed on a carrier or a bandwidth part (BWP), which can be interpreted as target DCI corresponding to the carrier or the BWP. Alternatively, in another example, the carrier or BWP scheduled by the target DCI may be interpreted as the target DCI corresponding to the carrier or BWP.

Optionally, an example in which the target DCI corresponding to the first object is understood as that the first object is scheduled by the target DCI is used for description.

Alternatively, in an embodiment, the first object is any one of following:

manner 1: a Uu cell or carrier for transmission of the first DCI;

manner 2: a Uu cell or carrier in which an SL resource scheduled by the first DCI is located;

manner 3: an SL cell or carrier scheduled by the first DCI;

manner 4: at least one cell or carrier having a first association relationship with an SL resource scheduled by the first DCI;

manner 5: a cell or carrier corresponding to DCI with a largest bit number of the target DCI in cells or carriers configured with the target DCI;

manner 6: a cell or carrier corresponding to DCI with a smallest bit number of the target DCI in cells or carriers configured with the target DCI;

manner 7: a cell or carrier corresponding to DCI with a largest bit number of the target DCI with bit number greater than or equal to the first bit number in N cells or carriers;

manner 8: a cell or carrier corresponding to DCI with a smallest bit number of the target DCI with bit number greater than or equal to the first bit number in N cells or carriers;

N is a positive integer, and the N cells or carriers are cells or carriers on which at least one target DCI of which bit number is greater than or equal to the first bit number is existed.

Manner 1 may be understood as that the first object is a cell or carrier that schedules the SL resource. For example, if SL scheduled by the SL DCI is transmitted on the cell 1, the SL DCI is included in a DCI size budget of the cell 1.

It needs to be noted that, the DCI size budget may be understood as an upper limit of a number of bit numbers of all DCI corresponding to the cell or carrier. Alternatively, the DCI size budget may be understood as an upper limit of a number of bit numbers of some formats or types of DCI corresponding to the cell or carrier. Alternatively, the DCI size budget may be understood as an upper limit of a number of a bit number of a format or type of DCI corresponding to the cell or carrier. One or more DCI size budgets may exist in one cell or carrier.

Manner 2 may be understood as that the first object is a scheduled Uu cell or carrier in which the SL is located. For example, if part of Uu resources on the cell 2 are reused on the SL, and at least part of this part of the SL resources scheduled by the SL DCI are transmitted on the cell 1, the SL DCI is included in a DCI size budget of the cell 2.

Manner 3 may be understood as that a carrier where a scheduled SL is located is regarded as an SL cell. For example, if the SL is scheduled by the SL DCI transmitted on the cell 1 on a carrier 2, the carrier 2 is regarded as an SL cell, and the SL DCI is included in a DCI size budget of the carrier 2 or the SL cell.

Manner 4 may be understood as that the SL has one or more cells or carriers having a first association relationship. The first association relationship may be understood as a DCI size budget association relationship. For example, if part of Uu resources on the cell 2 are reused for the SL, SL DCI transmitted on the cell 1 schedules at least part of this part of SL resources, and a cell 3 is an associated cell of the SL, the SL DCI is included in a DCI size budget of the cell 3.

For Manner 7, for example, both the cell 1 and the cell 2 have a plurality of pieces of target DCI, and each of the cell 1 and the cell 2 has a target size greater than an SL DCI size. Assuming that the target DCI size greater than the SL DCI size on the cell 1 is greater than that of the cell 2, the first object is the cell 1.

For Manner 8, for example, both the cell 1 and the cell 2 have a plurality of pieces of target DCI, and each of the cell 1 and the cell 2 has a target DCI size greater than the SL DCI size. Assuming that the target DCI size greater than the SL DCI size on the cell 1 is greater than that of the cell 2, the first object is the cell 2.

It needs to be explained that, for the Manner 5 to Manner 8, the first object may change as the carrier switches or changes, or the first object may change as the BWP switches.

It should be understood that the SL resource scheduled by the first DCI may be understood as the SL resource scheduled, or activated, or deactivated by the first DCI.

Optionally, in an embodiment, the first DCI meets at least one of following:

a number of bit numbers of the first DCI and third DCI is less than or equal to M1, M1 being a positive integer, and the third DCI being the Uu DCI corresponding to the first object. Optionally, for example, the number of the bit numbers of the first DCI and the third DCI is less than or equal to M1, M1 is a positive integer, and the third DCI is the Uu DCI scheduling the first object;

a number of bit numbers of the first DCI and fourth DCI is less than or equal to M2, M2 being a positive integer, and the fourth DCI being dedicated Uu DCI corresponding to the first object. Optionally, for example, the number of the bit numbers of the first DCI and the fourth DCI is less than or equal to M2, M2 is a positive integer, and the fourth DCI is the dedicated Uu DCI scheduling the first object; or a number of bit numbers of the first DCI scheduling the first object is less than or equal to M3, M3 being a positive integer.

In this embodiment, the number of bit numbers may be understood as the number of bit numbers of the first DCI and the third DCI. For example, if the bit number of the first DCI is 35, and the bit number of the third DCI includes 40, 50 and 55, the number of the bit numbers of the first DCI and the third DCI is 4. If the bit number of the first DCI is 40, and the bit number of the third DCI includes 40, 50 and 55, the number of the bit numbers of the first DCI and the third DCI is 3.

It should be understood that the foregoing M1, M2, and M3 may be understood as three different DCI size budgets. Alternatively, the three different DCI size budgets corresponding to M1, M2, and M3 may be matched arbitrarily, or can only meet one of restrictions. This is not further limited herein.

In a case that the number of the bit numbers of the first DCI and the third DCI is less than or equal to M1, at least one of following implementation solutions is at least included.

When the first object is the Uu cell or carrier for transmission of the SL DCI, if M1=4, a number of sizes of the SL DCI and the Uu DCI scheduling the Uu cell or carrier does not exceed 4.

When the first object is the Uu cell or carrier in which the scheduled SL is located, if M1=4, a number of sizes of the SL DCI and the Uu DCI scheduling the Uu cell or carrier in which the scheduled SL is located does not exceed 4.

When the first object is P cells or carriers having the first association relationship with the SL resource scheduled by the first DCI, if M1=4×P, a number of sizes of the SL DCI and the Uu DCI scheduling the one or more associated cells or carriers does not exceed 4×P.

When the first object is the cell or carrier corresponding to the DCI with the largest bit number of the target DCI in the cells or carriers configured with the target DCI, if M1=4, a number of sizes of the SL DCI and the Uu DCI scheduling the first object does not exceed 4.

When the first object is the cell or carrier corresponding to the DCI with the smallest bit number of the target DCI in the cells or carriers configured with the target DCI, if M1=4, a number of sizes of the SL DCI and the Uu DCI scheduling the first object does not exceed 4.

When the first object is the cell or carrier corresponding to the DCI with the largest bit number of the target DCI with bit number greater than or equal to the first bit number in the N cells or carriers, if M1=4, a number of sizes of the SL DCI and the Uu DCI scheduling the first object does not exceed 4.

When the first object is the cell or carrier corresponding to the DCI with the smallest bit number of the target DCI with bit number greater than or equal to the first bit number in the N cells or carriers, if M1=4, a number of sizes of the SL DCI and the Uu DCI scheduling the first object does not exceed 4.

In a case that the number of the bit numbers of the first DCI and the fourth DCI is less than or equal to M2, at least one of following implementation solutions is at least included.

When the first object is the Uu cell or carrier for transmission of the SL DCI, if M2=3, a number of sizes of the SL DCI and the dedicated Uu DCI scheduling the Uu cell or carrier does not exceed 3.

When the first object is the Uu cell or carrier in which the scheduled SL is located, if M2=3, a number of sizes of the SL DCI and the dedicated Uu DCI scheduling the Uu cell or carrier in which the scheduled SL is located does not exceed 4.

When the first object is P cells or carriers having the first association relationship with the SL resource scheduled by the first DCI, if M2=3×P, a number of sizes of the SL DCI and the dedicated Uu DCI scheduling the one or more associated cells or carriers does not exceed 3×P.

When the first object is the cell or carrier corresponding to the DCI with the largest bit number of the target DCI in the cells or carriers configured with the target DCI, if M2=3, a number of sizes of the SL DCI and the Uu DCI scheduling the first object does not exceed 3.

When the first object is the cell or carrier corresponding to the DCI with the smallest bit number of the target DCI in the cells or carriers configured with the target DCI, if M2=3, a number of sizes of the SL DCI and the Uu DCI scheduling the first object does not exceed 3.

When the first object is the cell or carrier corresponding to the DCI with the largest bit number of the target DCI with bit number greater than or equal to the first bit number in the N cells or carriers, if M2=3, a number of sizes of the SL DCI and the Uu DCI scheduling the first object does not exceed 3.

When the first object is the cell or carrier corresponding to the DCI with the smallest bit number of the target DCI with bit number greater than or equal to the first bit number in the N cells or carriers, if M2=3, a number of sizes of the SL DCI and the Uu DCI scheduling the first object does not exceed 3.

In a case that the bit number of the first DCI scheduling the first object is less than or equal to M3, the following implementation solutions are at least included.

When the SL cell or carrier is scheduled by the first DCI, it may be understood that a number of sizes of the SL DCI scheduling the SL cell or carrier does not exceed M2, and the M2 is 1 or 2. That is, the number of sizes of the SL DCI scheduling the SL cell or carrier does not exceed 1 or 2.

It should be understood that the DCI size budget of the first object may be configured by the network device, pre-configured, defined in a protocol, indicated by another user, or selected by a user.

Optionally, the first object may be configured by the network device, pre-configured, defined in the protocol, indicated by another user, or determined by the user.

Optionally, if the first object and/or the DCI size budget of the first object are pre-configured, indicated by another user, or determined by the user, the user may also report the first object and/or the DCI size budget of the first object.

Optionally, the second bit number of the second DCI is a bit number of the target DCI corresponding to a target object, and the target object is one of L second objects in the first object. L is a positive integer, and each of the second objects is one of a bandwidth part (BWP), a BWP pair, a cell pair, or a carrier pair.

In this embodiment, different target objects may respectively correspond to bit numbers of respective target DCI. For example, when the second object is the BWP or the BWP pair, the bit number of target DCI corresponding to the L second objects includes at least one of following:

a bit number of the target DCI corresponding to each BWP pair;

a bit number of the target DCI corresponding to each uplink (UL) BWP;

a bit number of the target DCI corresponding to each downlink (DL) BWP; or a bit number of the target DCI corresponding to each SL BWP.

In an example, the BWP pair may be a pair between UL BWP and the DL BWP, for example, if indexes (index, id) of BWPs are the same, the BWPs are one BWP pair. Optionally, a corresponding target DCI size is not configured for a BWP id that does not have a pair, for example, if there is only a DL BWP with BWP id=4 and no UL BWP with BWP id=4, BWP id=4 does not have the BWP pair, and there is no target DCI size corresponding to BWP id=4.

In other embodiments, the BWP pair may also be any one of following:

a pair between the SL BWP and the UL BWP;

a pair between the SL BWP and the DL BWP; or a pair among the SL BWP, the UL BWP, and the DL BWP.

Optionally, when the second object is the cell pair or the carrier pair, the bit number of the target DCI corresponding to the L second objects includes: a bit number of the target DCI corresponding to each cell pair or carrier pair.

The bit number of the target DCI corresponding to each cell pair or carrier pair may be understood as including at least one of following:

a bit number of the target DCI corresponding to each uplink cell pair or carrier pair;

a bit number of the target DCI corresponding to each downlink cell pair or carrier pair; or a bit number of the target DCI corresponding to each SL cell pair or carrier pair.

It should be understood that definition of the target object may be configured according to actual needs. In Embodiment 1, the target object is an activated second object in the L second objects, such as an activated BWP or BWP pair. In this embodiment, the user may determine the SL DCI size according to a target DCI size corresponding to a currently activated BWP pair, the UL BWP, the DL BWP, or the SL BWP.

In Embodiment 2, the target object may be any one of following:

a second object corresponding to DCI with a largest or smallest bit number of the target DCI in the L second objects;

a second object including most or least resources in the L second objects;

a second object including a largest or smallest number of resources in the L second objects;

a second object whose bit number of the target DCI is closest to the first bit number in the L second objects;

a second object whose bit number of the target DCI is larger than the first bit number and closest to the first bit number in the L second objects; or a second object whose bit number of the target DCI is smaller than the first bit number and closest to the first bit number in the L second objects.

A size of the resources included above may be understood as a width of a frequency domain resource. A number of the resources may be understood as a number of frequency domain resource units.

It needs to be noted that, Embodiment 1 may be combined with Embodiment 2. In other words, the target object meets both the requirement of Embodiment 1, and the requirement of Embodiment 2, for example, a second object with the most or least resources included in a plurality of activated second objects in the L second objects.

Optionally, in a case that the target object is switched or changed, the second bit number is: a bit number of the target DCI corresponding to a target object which is switched or changed target.

By using the BWP as an example, in a case that the currently activated BWP is switched, the second bit number corresponds to a bit number of target DCI corresponding to the switched BWP.

Optionally, in a case that at least one sub-object in the target object is switched or changed, the second bit number of the second DCI is: a bit number of the target DCI corresponding to a target object in which a sub-object which is switched or changed is located.

By using the BWP pair as an example, the UL BWP in BWP pair 1 is a UL BWP1. Assuming that the UL BWP1 is switched to a UL BWP2, the BWP pair is also switched to a BWP pair 2 to which the UL BWP2 belongs. In this case, the user may determine the SL DCI size according to a target DCI size corresponding to the currently switched BWP pair 2, and may also determine the SL DCI size according to the target DCI size corresponding to the currently switched UL BWP2.

A change of the target object may be understood as modifying or repairing some or all of the L second objects, causing the target object to change.

Optionally, the second DCI may include one or more pieces of target DCI. In the following embodiments, an example in which one piece of the second DCI includes Q1 pieces of target DCI is used for description, where Q1 is an integer greater than 1. In this embodiment, the determining a third bit number of the first DCI according to the first bit number of the first DCI and a second bit number of second DCI includes:

obtaining the third bit number based on alignment between the first DCI and fifth DCI, where the fifth DCI is first or last target DCI in Q2 pieces of target DCI arranged according to the bit number of the target DCI from large to small, and the Q2 pieces of target DCI are part or all of the Q1 pieces of target DCI.

The third bit number is equal to the second bit number corresponding to the fifth DCI or the first bit number. A bit number of the fifth DCI is equal to the first bit number or the third bit number.

In this embodiment of the present disclosure, the complexity of blind detection of the terminal can be reduced because the first DCI and the fifth DCI are aligned.

It needs to be noted that, in an embodiment, an alignment operation for the first DCI and the fifth DCI may be necessary, that is, the SL DCI and a certain piece of Uu DCI have to be aligned regardless of whether the DCI scheduling the first object exceeds the DCI size budget. In another embodiment, an alignment operation for the first DCI may be optionally performed, for example, the alignment operation is required only when the SL DCI size and the target DCI size exceed the DCI size budget.

In this embodiment, the alignment between the first DCI and the fifth DCI may be understood as aligning the first DCI with the fifth DCI, or aligning the fifth DCI with the first DCI. When the first DCI is aligned with the fifth DCI, the third bit number is equal to the second bit number corresponding to the fifth DCI, and the bit number of the fifth DCI is equal to the third bit number. When the fifth DCI is aligned with the first DCI, the third bit number is equal to the first bit number, and the bit number of the fifth DCI is equal to the first bit number.

It should be understood that, when the bit number of the first DCI is less than the bit number of the fifth DCI, if the first DCI is aligned with the fifth DCI, the first DCI may be aligned with the fifth DCI by filling 0. When the bit number of the first DCI is greater than the bit number of the fifth DCI, if the first DCI is aligned with the fifth DCI, the first DCI may be aligned with the fifth DCI by removing partial bits. For example, last one or more bits of the first DCI are deleted so that the first DCI is aligned with the fifth DCI.

Assuming that the target DCI is configured by the network device, if the target DCI size is equal to the SL DCI size, the size is a final size of the SL DCI. It should be understood that when a plurality of pieces of target DCI are configured by the network device, the plurality of pieces of target DCI may be the same or different. This is not further limited herein.

Assuming that M pieces of target DCI are configured by the network device and M≥2, if no target DCI size is equal to the SL DCI size, for example, M4 target DCI sizes<the third bit number, or the third bit number<M5 target DCI sizes, or M4 target DCI sizes<the third bit number<M5 target DCI sizes, a method for determining the third bit number (that is, a final SL DCI size) includes one of following:

the SL DCI is aligned to target DCI with a smallest size in M5 pieces of target DCI, for example, the SL DCI is filled with 0 to be the same as the target DCI size;

target DCI with a largest size in M4 pieces of target DCI is aligned to the SL DCI, for example, the target DCI size is filled with 0 to be the same as the SL DCI size;

target DCI with a largest size among target DCI that is not in the first format in M4 pieces of target DCI is aligned to the SL DCI. For example, DCI with a largest size in the M4 pieces of target DCI that are not in a DCI format 0-2 is filled with 0 to be the same as the SL DCI size;

target DCI with a smallest size among target DCI that is not in the first format in M4 pieces of target DCI is aligned to the SL DCI. For example, DCI with a smallest size in the M4 pieces of target DCI that are not in a DCI format 0-2 is filled with 0 to be the same as the SL DCI size;

target DCI with a largest size among target DCI in the second format in M4 pieces of target DCI is aligned to the SL DCI. For example, target DCI of a DCI format 0-1, which has a largest size in the M4 pieces of target DCI, is filled with 0 to be the same as the SL DCI size;

target DCI with a smallest size among target DCI in the second format in M4 pieces of target DCI is aligned to the SL DCI. For example, target DCI of a DCI format 0-1, which has a smallest size in the M4 pieces of target DCI, is filled with 0 to be the same as the SL DCI size.

Optionally, the target DCI includes at least one of following: DCI of user-specific search space, fallback DCI, non-fallback DCI, DCI that is not in a first format, or DCI in a second format.

The user-specific search space (USS) DCI may be understood as DCI configured in the USS, which is referred to as USS DCI for convenience in this patent. The USS DCI may belong to either the fallback or the non-fallback DCI, that is, includes at least one of FB USS DCI or NFB USS DCI. The NFB USS DCI may be in a DCI format 0-1. A DCI format configured in a common search space (CSS) is referred to as CSS DCI.

The DCI in the second format may include at least one of the DCI format 0-1 or a DCI format 0-0.

The DCI in the first format may be in a DCI format 0-2.

It should be understood that, in this embodiment, when the target DCI includes at least two restrictions described above, the target DCI may be NFB USS DCI in the second format DCI format 0-1, or the target DCI is or is not NFB USS DCI of the first format DCI format 0-2.

In an embodiment, the Q2 pieces of target DCI are target DCI that is not in the first format in the Q1 pieces of target DCI.

Optionally, a type of the target DCI may be configured by the network device, pre-configured, defined in the protocol, indicated by another user, or determined by the user. The user may also report the target DCI type if the target DCI type is pre-configured, defined in the protocol, indicated by another user, or determined by the user.

Optionally, in a case that a network device does not configure the second DCI for a terminal, a behavior of the terminal includes one of following:

determining that an error occurs in the first DCI;

skipping monitoring the first DCI; or monitoring the first DCI, the third bit number being equal to the first bit number.

The determining that an error occurs in the first DCI may be understood as an error case.

It needs to be noted that, if no target DCI size is equal to the SL DCI size, the SL DCI size is aligned with a certain piece of target DCI. Alternatively, if no target DCI size is equal to the SL DCI size and a corresponding DCI size budget is exceeded, the SL DCI size is aligned with a certain piece of target DCI. In this embodiment, the aligned SL DCI size is a final SL DCI size, or the aligned target DCI size is a final size of the target DCI.

Optionally, the user obtains reference DCI, and the SL DCI is aligned with the reference DCI. The obtaining method includes at least one of following.

The network device indicates the reference DCI. Optionally, the reference DCI belongs to the target DCI. For example, target DCI 1, target DCI 2, and target DCI 3 are configured by the network device, and the network device indicates that the target DCI 3 is the reference DCI, and sizes of the SL DCI and the target DCI 3 are aligned.

A user selects the reference DCI. Optionally, the reference DCI belongs to the target DCI. For example, the target DCI 1, target DCI 2, and target DCI 3 are configured by the network device, and the user selects the target DCI 3 as the reference DCI, and sizes of the SL DCI and the target DCI 3 are aligned.

Optionally, the user may report the reference DCI obtained by the user.

Optionally, at least one of the target DCI or the SL DCI is the DCI of the first object.

In the present disclosure, for simplicity, DCI scheduling uplink transmission is referred to as UL DCI, and DCI scheduling downlink transmission is referred to as DL DCI.

Optionally, the target DCI is the UL DCI. For example, in an embodiment, if the target DCI is the UL DCI and USS DCI, the target DCI is in a DCI format 0-0 or a DCI format 0-1 in the USS. In another embodiment, if the target DCI is the UL DCI and FB USS DCI, the target DCI is in a DCI format 0-0 in the USS. In still another embodiment, if the target DCI is the UL DCI and NFB DCI, the target DCI is in a DCI format 0-1.

Optionally, the target DCI is the DL DCI. For example, in an embodiment, if the target DCI is the DL DCI and USS DCI, the target DCI is in a DCI format 1-0 or a DCI format 1-1 in the USS. In another embodiment, if the target DCI is the DL DCI and FB USS DCI, the target DCI is in a DCI format 1-0 in the USS. In another embodiment, if the target DCI is the DL DCI and NFB DCI, the target DCI is in a DCI format 1-1.

For better understanding of the present disclosure, implementations of the present disclosure are described below in detail through examples.

Embodiment 1. Each target object has its own corresponding target DCI size, which includes at least one of following:

A. A target DCI size corresponding to each BWP pair;

B. A target DCI size configuring for each UL BWP;

C. A target DCI size configuring for each DL BWP; or

D. A target DCI size configuring for each SL BWP.

For A, optionally, the BWP pair may be a pair between the UL BWP and the DL BWP. For example, when BWP ids of the UL BWP and the DL BWP are the same, the UL BWP and the DL BWP may be regarded as a BWP pair, and corresponding target DCI sizes are configured for BWP pairs corresponding to different BWP ids. Optionally, a corresponding target DCI size is not configured for a BWP id that does not have a pair, for example, if there is only a DL BWP with BWP id=4 and no UL BWP with BWP id=4, BWP id=4 does not have the BWP pair, and there is no corresponding target DCI size configured with BWP id=4.

For A, optionally, the BWP pair may be a pair between the SL BWP and the UL BWP. For example, the SL BWP and the UL BWP may be regarded as a BWP pair when BWP ids thereof are the same.

For A, optionally, the BWP pair may be a pair between the SL BWP and the DL BWP. For example, the SL BWP and the DL BWP may be regarded as a BWP pair when BWP ids thereof are the same.

For A, optionally, the BWP pair may be a pair among the SL BWP, the UL BWP, and the DL BWP. For example, the SL BWP, the UL BWP, and the DL BWP may be regarded as a BWP pair when BWP ids thereof are the same.

For B, for example, corresponding target DCI sizes are respectively configured for UL BWP pairs corresponding to different UL BWP ids.

For C, for example, corresponding target DCI sizes are respectively configured for DL BWP pairs corresponding to different DL BWP ids.

For D, for example, corresponding target DCI sizes are respectively configured for SL BWP pairs corresponding to different SL BWP ids.

Optionally, the target object is an activated target object (for example, an activated BWP), or the target object is a configured or pre-configured target object (for example, a configured BWP, whether activated or not).

Optionally, the target object is a target object within the first object, for example, the BWP is a BWP within the first object.

Embodiment 2. The corresponding target DCI size is determined according to the BWP, and the target DCI size is determined in a case that the BWP is switched, thereby determining the SL DCI size.

A user determines the SL DCI size according to a target object activated by the current user, which may include at least one of following cases:

the user determines a corresponding SL DCI size according to a target DCI size corresponding to a currently activated BWP pair;

the user determines a corresponding SL DCI size according to a target DCI size corresponding to a currently activated UL BWP;

the user determines a corresponding SL DCI size according to a target DCI size corresponding to a currently activated DL BWP; or the user determines a corresponding SL DCI size according to a target DCI size corresponding to a currently activated SL BWP.

Optionally, when the target object is switched, the user determines the SL DCI size according to a target DCI size corresponding to the switched target object; or when at least one sub-object in the target object is switched, the user determines the SL DCI size according to the target DCI size corresponding to the target object in which the switched sub-object is located, which may include the following cases:

for example, a UL BWP in a BWP Pair 1 is a UL BWP1. Assuming that the UL BWP1 is switched to a UL BWP2, the BWP Pair is also switched to a BWP Pair 2 to which the UL BWP2 belongs, and the user determines the SL DCI size according to a target DCI size corresponding to the currently switched BWP Pair 2;

for example, the UL BWP is switched from the UL BWP1 to the UL BWP2, and the user determines the SL DCI size according to a target DCI size corresponding to the currently switched UL BWP2;

for example, the DL BWP is switched from the DL BWP1 to the DL BWP2, and the user determines the SL DCI size according to a target DCI size corresponding to the currently switched DL BWP2;

for example, the SL BWP is switched from the SL BWP1 to the SL BWP2, and the user determines the SL DCI size according to a target DCI size corresponding to the currently switched SL BWP2.

Optionally, the target object is an activated target object (for example, an activated BWP), or the target object is a configured or pre-configured target object (for example, a configured BWP, whether activated or not).

Optionally, the target object is a target object within the first object. For example, the BWP is a BWP within the first object.

Embodiment 3. One piece of target DCI

The network device configures one piece of target DCI and aligns the target DCI with the SL DCI.

For example, if the target DCI size<the SL DCI size, the target DCI is filled with 0, so that a size of the target DCI after filled with 0 is the same as the SL DCI size.

For example, if the target DCI size>the SL DCI size, the SL DCI is filled with 0, so that a size of the SL DCI after filled with 0 is the same as the SL DCI size.

The aligned SL DCI size is the final SL DCI size.

Embodiment 4. M pieces of target DCI

The network device configures M pieces of target DCI, M≥2, and a method for determining the final SL DCI size includes at least one of following methods.

a) The SL DCI size>M target DCI sizes.

Optionally, target DCI with a largest size in the M target DCI sizes may be aligned to the SL DCI. For example, the target DCI with the largest size is filled with 0 to be the same as the SL DCI size.

b) If M4 target DCI sizes<the SL DCI size<M5 target DCI sizes, one of following is included: i. The SL DCI is aligned to target DCI with a smallest size in M5 pieces of target DCI. ii. Target DCI with a largest size in M4 pieces of target DCI is aligned to the SL DCI. iii. Target DCI with a largest size among target DCI that is not in the first format in M4 pieces of target DCI is aligned to the SL DCI. iv. The SL DCI is aligned to target DCI with a smallest size among target DCI that is not in the first format in M5 pieces of target DCI. v. Target DCI with a largest size among target DCI in the second format in M4 pieces of target DCI is aligned to the SL DCI. vi. The SL DCI is aligned to target DCI with a smallest size among target DCI in the second format in M5 pieces of target DCI.

In a case that the SL DCI is aligned to the target DCI with the smallest size in the M5 pieces of target DCI, in an embodiment, for example, the SL DCI may be filled with 0 to be the same as the target DCI size. In another embodiment, for example, M>2, and M5=2, that is, if two target DCI sizes are greater than the SL DCI size (optionally, for example, greater than a number of information bits in the SL DCI), and are respectively a DCI format 0-1 and a DCI format 0-2, and the SL DCI size<a DCI format 0-1 size<a DCI format 0-2 size, the SL DCI size is aligned to the DCI format 0-1 size in this case.

In a case that the target DCI with the largest size in the M4 pieces of target DCI is aligned to the SL DCI, in an embodiment, for example, the target DCI size may be filled with 0 to be the same as the target DCI size. In another embodiment, for example, M>2, and M4=2, that is, two target DCI sizes are less than the SL DCI size, and are respectively a DCI format 0-1 and a DCI format 0-2, and the SL DCI size (optionally, for example, a number of information bits in the SL DCI)>a DCI format 0-1 size>a DCI format 0-2 size, the DCI format 0-1 is aligned to the SL DCI size.

In a case that the target DCI with the largest size among the target DCI that is not in the first format in the M4 pieces of target DCI is aligned to the SL DCI, in an embodiment, for example, DCI with a largest size in the M4 pieces of target DCI that are not in DCI format 0-2 is filled with 0 to be the same as the SL DCI size.

In a case that the target DCI with the largest size among the target DCI in the second format in the M4 pieces of target DCI is aligned to the SL DCI, in an embodiment, for example, target DCI of DCI format 0-1 with a largest size in the M4 pieces of target DCI is filled with 0 to be the same as the SL DCI size.

Optionally, the aligned SL DCI size is the final SL DCI size.

Optionally, the aligned target DCI size is the final size of the target DCI.

Optionally, if the M4 target DCI sizes<the SL DCI size<the M5 target DCI sizes, the user selects different methods for determining the SL DCI size under different cases, for example, the target DCI is DCI in the second format, that is, the DCI format 0_1.

For example, assuming that target DCI A, target DCI B, and target DCI C are all greater than the SL DCI, and the target DCI B is in the second format, that is, the format 0_1, the SL DCI is aligned to the target DCI B. In other words, in any case, as long as the format 0_1 is greater than the SL DCI, the SL DCI is aligned to the format.

It should be noted that, according to different cases of the M4 pieces of target DCI and/or the M5 pieces of target DCI included by DCI configured by the network device, different implementations can be selected and implemented, and a plurality of implementations can also be combined to implement. Corresponding second formats may also be the same or different. This is not limited herein.

Optionally, if no format 0_1 is greater than the SL DCI, the format 0_1 is aligned to the SL DCI. Alternatively, the target DCI includes at least one of the second format 1 or the second format 2, and the second format 1 and the second format 2 may be the same or different.

For example, the SL DCI is aligned to DCI of the second format 1 only when there is a piece of DCI of the second format 1 in the M5 pieces of target DCI; otherwise, the DCI of the second format 2 is aligned to the SL DCI if there is a piece of DCI of the second format 2 in the M4 pieces of target DCI. For example, assuming that 0-2 is URLLC, a size of 0-2 may not need to be modified.

Assuming that both the second format 1 and the second format 2 are 0-1, if both the DCI format 0-1 and the DCI format 0-2 are greater than the SL DCI size, the SL DCI is aligned to the DCI format 0-1, regardless of who is larger or smaller between the DCI format 0-1 and the DCI format 0-2. In this case, it may be understood that the target DCI needs to be in a DCI format 0-1 target format. For example, assuming that the DCI format 0-1 and the DCI format 0-2 are configured, if the DCI format 0-1<the SL DCI<the DCI format 0-2, the DCI format 0-1 is aligned to the SL DCI.

Assuming that the second format 1 and the second format 2 are respectively 0-0 and 0-1, if both the DCI format 0-0 and the DCI format 0-2 are greater than the SL DCI size, the SL DCI is aligned to the DCI format 0-0, regardless of who is larger or smaller between the DCI format 0-0 and the DCI format 0-2. In this case, it may be understood that the target DCI needs to be in a DCI format 0-0 target format.

For example, assuming that the DCI format 0-1 and the DCI format 0-2 are matched, if the DCI format 0-1<the SL DCI<the DCI format 0-2, the DCI format 0-1 is aligned to the SL DCI.

Assuming that the second format 1 and the second format 2 are respectively 0-2 and 0-1, if the DCI format 0-2 and the DCI format 0-1 are greater than the SL DCI size, and a DCI format 0-1 size>a DCI format 0-2 size, the SL DCI is aligned to the DCI format 0-2. For example, assuming that the DCI format 0-1 and the DCI format 0-2 are matched, if the DCI format 0-1 size<the SL DCI size, and the DCI format 0-2 size<the SL DCI size, the DCI format 0-1 is aligned to the SL DCI regardless of who is larger or smaller between the DCI format 0-1 and the DCI format 0-2.

Assuming that only the second format 2 exists and is 0-1, if the DCI format 0-2 and the DCI format 0-1 are greater than the SL DCI size, and a DCI format 0-1 size>a DCI format 0-2 size, the SL DCI is aligned to the DCI format 0-2. For example, assuming that the DCI format 0-1 and the DCI format 0-2 are matched, if the DCI format 0-1 size<the SL DCI size, and the DCI format 0-2 size<the SL DCI size, the DCI format 0-1 is aligned to the SL DCI regardless of who is larger or smaller between the DCI format 0-1 and the DCI format 0-2.

Example 5. Reference DCI

The user obtains the reference DCI and aligns the reference DCI with the SL DCI.

For example, if the reference DCI size<the SL DCI size, the reference DCI is filled with 0, so that a size of the target DCI after filled with 0 is the same as the SL DCI size.

For example, if the reference DCI size>the SL DCI size, the SL DCI is filled with 0, so that a size of the SL DCI after filled with 0 is the same as the SL DCI size.

FIG. 3 is a structural diagram of a communication device according to an embodiment of the present disclosure. As shown in FIG. 3, a communication device 300 includes:

an obtaining module 301, configured to obtain a first bit number of first DCI, where the first DCI is sidelink downlink control information SL DCI;

a determining module 302, configured to determine a third bit number of the first DCI according to the first bit number and a second bit number of second DCI; and a transmission module 303, configured to perform transmission of the first DCI according to the third bit number.

Optionally, the second DCI includes target DCI in Uu DCI corresponding to a first object.

Optionally, the first object is any one of following:

a Uu cell or carrier for transmission of the first DCI;

a Uu cell or carrier in which an SL resource scheduled by the first DCI is located;

an SL cell or carrier scheduled by the first DCI;

at least one cell or carrier having a first association relationship with an SL resource scheduled by the first DCI;

a cell or carrier corresponding to DCI with a largest bit number of the target DCI in cells or carriers configured with the target DCI;

a cell or carrier corresponding to DCI with a smallest bit number of the target DCI in cells or carriers configured with the target DCI;

a cell or carrier corresponding to DCI with a largest bit number of the target DCI with bit number greater than or equal to the first bit number in N cells or carriers; or a cell or carrier corresponding to DCI with a smallest bit number of the target DCI with bit number greater than or equal to the first bit number in N cells or carriers, where N is a positive integer, and the N cells or carriers are cells or carriers on which at least one target DCI of which bit number is greater than or equal to the first bit number is existed.

Optionally, the first DCI meets at least one of following:

a number of bit numbers of the first DCI and third DCI is less than or equal to M1, M1 being a positive integer, and the third DCI being the Uu DCI corresponding to the first object;

a number of bit numbers of the first DCI and fourth DCI is less than or equal to M2, M2 being a positive integer, and the fourth DCI being dedicated Uu DCI corresponding to the first object; or a number of bit numbers of the first DCI scheduling the first object is less than or equal to M3, M3 being a positive integer.

Optionally, the second bit number of the second DCI is a bit number of the target DCI corresponding to a target object, and the target object is one of L second objects in the first object. L is a positive integer, and each of the second objects is one of a bandwidth part BWP, a BWP pair, a cell pair, or a carrier pair.

Optionally, the bit number of the target DCI corresponding to the L second objects includes at least one of following:

a bit number of the target DCI corresponding to each BWP pair;

a bit number of the target DCI corresponding to each uplink BWP;

a bit number of the target DCI corresponding to each downlink BWP; or a bit number of the target DCI corresponding to each SL BWP.

Optionally, the bit number of the target DCI corresponding to the L second objects includes: a bit number of the target DCI corresponding to each cell pair or carrier pair.

Optionally, the target object is an activated second object in the L second objects.

Optionally, the target object is any one of following:

a second object corresponding to DCI with a largest or smallest bit number of the target DCI in the L second objects;

a second object including most or least resources in the L second objects;

a second object including a largest or smallest number of resources in the L second objects;

a second object whose bit number of the target DCI is closest to the first bit number in the L second objects;

a second object whose bit number of the target DCI is larger than the first bit number and closest to the first bit number in the L second objects; or a second object whose bit number of the target DCI is smaller than the first bit number and closest to the first bit number in the L second objects.

Optionally, in a case that the target object is switched or changed, the second bit number is: a bit number of the target DCI corresponding to a target object which is switched or changed.

Optionally, in a case that at least one sub-object in the target object is switched or changed, the second bit number of the second DCI is: a bit number of the target DCI corresponding to a target object in which a sub-object which is switched or changed is located.

Optionally, the second DCI includes Q1 pieces of target DCI, Q1 being an integer greater than 1.

Optionally, the determining module is configured to: obtain the third bit number based on alignment between the first DCI and fifth DCI, where the fifth DCI is first or last target DCI in Q2 pieces of target DCI arranged according to the bit number of the target DCI from large to small, and the Q2 pieces of target DCI are part or all of the Q1 pieces of target DCI.

Optionally, the Q2 pieces of target DCI are target DCI that is not in a first format in the Q1 pieces of target DCI.

Optionally, the third bit number is equal to the second bit number corresponding to the fifth DCI or the first bit number.

Optionally, a bit number of the fifth DCI is equal to the first bit number or the third bit number.

Optionally, the target DCI includes at least one of following: DCI of user-specific search space, fallback DCI, non-fallback DCI, DCI that is not in a first format, or DCI in a second format.

Optionally, in a case that a network device does not configure the second DCI for a terminal, a behavior of the terminal includes one of following:

determining that an error occurs in the first DCI;

skipping monitoring the first DCI; or monitoring the first DCI, the third bit number being equal to the first bit number.

The communication device provided in the embodiments of the present disclosure can implement all processes implemented by the communication device described in the method embodiments shown in FIG. 2. To avoid repetition, details are described herein again.

Figures 4, 5:
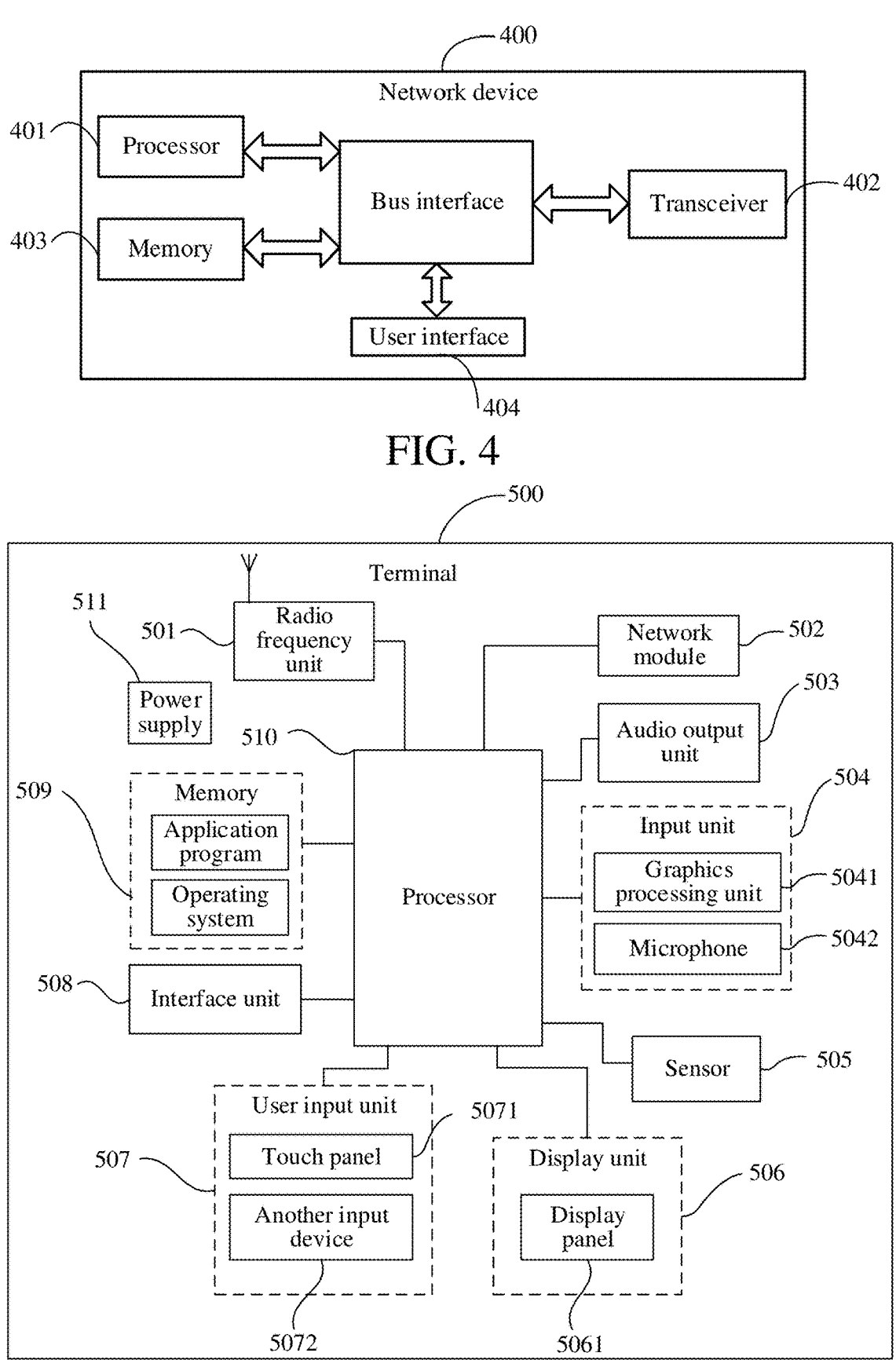
FIG. 4 is a second structural diagram of a communication device according to an embodiment of the present disclosure.
FIG. 5 is a third structural diagram of a network device according to an embodiment of the present disclosure.

FIG. 4 is a structural diagram of another communication device (for example, a network device may be used as an example for description) according to an embodiment of the present disclosure. As shown in FIG. 4, a network device 400 includes: a processor 401, a transceiver 402, a memory 403, and a bus interface.

The processor 401 is configured to obtain a first bit number of first DCI, where the first DCI is sidelink downlink control information SL DCI; and determine a third bit number of the first DCI according to the first bit number and a second bit number of second DCI.

The transceiver 402 is configured to perform transmission of the first DCI according to the third bit number.

It should be understood that, in this embodiment, the foregoing processor 401 and transceiver 402 can implement various processes implemented by the communication device in the method embodiments of FIG. 2. To avoid repetition, details are not described herein again.

In FIG. 4, a bus architecture may include any quantity of interconnected buses and bridges, and connects together circuits that are of one or more processors represented by the processor 401 and of a memory represented by the memory 403. The bus architecture may further connect various other circuits for example, a peripheral device, a voltage stabilizer, and a power management circuit. These are known in the art, and therefore are not further described in this specification. The bus interface provides an interface. The transceiver 402 may be a plurality of components. To be specific, the transceiver 402 includes a transmitter and a receiver, and provides a unit configured to communicate with various other apparatuses on a transmission medium. For different user equipment, the user interface 404 may also be an interface that can connect to a needed device externally or internally. The connected device may include, but is not limited to, a keypad, a display, a speaker, a microphone, a joystick, or the like.

The processor 401 is responsible for bus architecture management and general processing. The memory 403 may store data used by the processor when the processor 401 performs an operation.

Optionally, an embodiment of the present disclosure further provides a network device, including a processor 401, a memory 403, and a computer program stored in the memory 403 and executable on the processor 401, where the computer program, when executed by the processor 401, implements the processes of the embodiments of the DCI transmission method described above, and can achieve the same technical effects. To avoid repetition, details are not described herein again.

FIG. 5 is a schematic diagram of a hardware structure of a communication device (for example, a terminal may be used as an example for description) for implementing various embodiments of the present disclosure. A terminal 500 includes but is not limited to: components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that a terminal structure shown in FIG. 5 constitutes no limitation on the terminal, and the terminal may include more or fewer components than those shown in the figure, or some components may be combined, or a different component deployment may be used. In the embodiments of the present disclosure, the terminal includes, but is not limited to, a mobile phone, a tablet computer, a notebook computer, a palmtop computer, an in-vehicle terminal, a wearable device, a pedometer, and the like.

The processor 510 is configured to obtain a first bit number of first DCI, where the first DCI is sidelink downlink control information SL DCI; and determine a third bit number of the first DCI according to the first bit number and a second bit number of second DCI.

The radio frequency unit 501 is configured to perform transmission of the first DCI according to the third bit number.

It should be understood that, in this embodiment, the processor 510 and the radio frequency unit 501 can implement various processes implemented by the communication device in the method embodiments of FIG. 2. To avoid repetition, details are not described herein again.

It is to be understood that, in this embodiment of the present disclosure, the radio frequency unit 501 may be configured to transmit and receive information or transmit and receive signals during a call. Optionally, the radio frequency unit 501 is configured to receive downlink data from a base station and transmit downlink data to the processor 510 for processing; and in addition, the radio frequency unit transmits uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with another device through a wireless communication system and a network.

The terminal may provide, by using the network module 502, wireless broadband Internet access for a user, for example, help the user to receive or send an email, browse a webpage, and access stream media.

The audio output unit 503 may convert audio data received by the radio frequency unit 501 or the network module 502 or stored on the memory 509 into audio signals and output the audio signals as sounds. In addition, the audio output unit 503 may provide an audio output (such as a call signal receiving sound or a message receiving sound) related to a specific function executed by the terminal 500. The audio output unit 503 includes a speaker, a buzzer, a receiver, and the like The input unit 504 is configured to receive an audio or video signal. The input unit 504 may include a graphics processing unit (GPU) 5041 and a microphone 5042. The graphics processing unit 5041 performs processing on image data of a static picture or a video acquired by an image acquisition apparatus (for example, a camera) in a video acquisition mode or an image acquisition mode. The processed image frame can be displayed on the display unit 506. An image frame processed by the graphics processing unit 5041 may be stored in the memory 509 (or another storage medium) or sent by using the radio frequency unit 501 or the network module 502. The microphone 5042 may receive a sound and can process such a sound into audio data. The processed audio data may be converted, in a phone call mode, into a format that may be sent by the radio frequency unit 501 to a mobile communication base station.

The terminal 500 further includes at least one sensor 505 such as an optical sensor, a motion sensor, or another sensor. Optionally, the optical sensor includes an ambient light sensor and a proximity sensor. The optical sensor may include an ambient light sensor and a proximity sensor, where the ambient light sensor may adjust luminance of the display panel 5061 according to the luminance of the ambient light, and the proximity sensor may switch off the display panel 5061 and/or backlight when the terminal 500 is moved to the ear. As one type of motion sensor, an accelerometer sensor can detect magnitudes of accelerations in various directions (generally, on three axes), may detect a magnitude and a direction of the gravity when static, and may be applied to recognizing the attitude of the terminal (for example, switching between landscape orientation and portrait orientation, a related game, and magnetometer attitude calibration), a function related to vibration recognition (such as a pedometer and a knock), and the like. The sensor 505 may further include a fingerprint sensor, a pressure sensor, an iris sensor, a molecular sensor, a gyroscope, a barometer, a hygrometer, a thermometer, an infrared sensor, and the like, which are not described herein in detail.

The display unit 506 is configured to display information inputted by the user or information provided for the user. The display unit 506 may include a display panel 5061. The display panel 5061 may be configured in the form of a liquid crystal display (LCD), an organic light-emitting diode (OLED), or the like.

The user input unit 507 may be configured to receive input digit or character information, and generate a keyboard signal input related to the user setting and function control of the terminal. Optionally, the user input unit 507 includes a touch panel 5071 and another input device 5072. The touch panel 5071, also referred to as a touchscreen, can collect a touch operation of the user on or near the touch panel (such as an operation of the user on or near the touch panel 5071 by using any suitable object or attachment, such as a finger or a touch pen). The touch panel 5071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and transmits the touch point coordinates to the processor 510. In addition, the touch controller receives a command transmitted by the processor 510 and executes the command. In addition, the touch panel 5071 may be implemented by using various types, such as a resistive type, a capacitance type, an infrared type, and a surface acoustic wave type. In addition to the touch panel 5071, the user input unit 507 may further include the another input device 5072. Optionally, the another input device 5072 may include, but is not limited to, a physical keyboard, a functional key (for example, a volume control key or a switch key), a track ball, a mouse, and a joystick, and the details will not be described herein again.

Optionally, the electromagnetic driving mechanism further includes: the touch panel 5071 may cover the display panel 5061. After detecting a touch operation on or near the touch panel, the touch panel 5071 transfers the touch operation to the processor 510, to determine a type of a touch event. Then, the processor 510 provides a corresponding visual output on the display panel 5061 according to the type of the touch event. Although the touch panel 5071 and the display panel 5061 are used as two separate parts to implement input and output functions of the terminal in FIG. 5, in some embodiments, the touch panel 5071 and the display panel 5061 may be integrated to implement the input and output functions of the terminal, which is not limited herein.

The interface unit 508 is an interface for connecting an external apparatus and the terminal 500. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 508 may be configured to receive an input (such as data information or electric power) from an external apparatus and transmit the received input to one or more elements in the terminal 500 or may be configured to transmit data between the terminal 500 and an external apparatus.

The memory 509 may be configured to store a software program and various data. The memory 509 may mainly include a program storage area and a data storage area. The program storage area may store an operating system, an application required by at least one function (for example, a sound playback function and an image display function), and the like. The data storage area may store data (for example, audio data and a phone book) created according to the use of the mobile phone. In addition, the memory 509 may include a high speed random access memory, and may further include a non-volatile memory, such as at least one magnetic disk storage device, a flash memory, or another non-volatile solid state storage device.

The processor 510 is the control center of the terminal, and is connected to various parts of the terminal by various interfaces and lines. By running or executing the software program and/or module stored in the memory 509 and invoking data stored in the memory 509, the processor performs various functions of the terminal and processes data, thereby monitoring the terminal. Optionally, the processor 510 may include one or more processing units. Optionally, the processor 510 may integrate an application processor and a modem processor. The application processor mainly processes an operating system, a user interface, an application, and the like. The modem processor mainly processes wireless communication. It may be understood that the modem processor may alternatively not be integrated into the processor 510.

The terminal 500 may further include the power supply 511 (such as a battery) for supplying power to the components. Optionally, the power supply 511 may be logically connected to the processor 510 by a power management system, thereby implementing functions such as charging, discharging, and power consumption management by using the power management system.

In addition, the terminal 500 includes some functional module that are not shown, which are not described herein in detail.

Optionally, an embodiment of the present disclosure further provides a terminal, including a processor 510, a memory 509, and a computer program stored in the memory 509 and executable on the processor 510, where the computer program, when executed by the processor 510, implements the processes of the embodiments of the DCI transmission method described above, and can achieve the same technical effects. To avoid repetition, details are not described herein again.

An embodiment of the present disclosure further provides a non-transitory computer-readable storage medium, storing a computer program, the computer program, when executed by a processor, implementing various processes of the embodiments of the DCI transmission method of the communication device provided in the embodiments of the present disclosure, and can achieve the same technical effects. To avoid repetition, details are not described herein again. The non-transitory computer-readable storage medium is, for example, a read-only memory (ROM), a random access memory (RAM), a magnetic disk, or an optical disc.

It needs to be noted that, in this specification, terms "include", "comprise", and any variants thereof are intended to cover a non-exclusive inclusion. Therefore, in the context of a process, method, object, or device that includes a series of elements, the process, method, object, or apparatus not only includes such elements, but also includes other elements not specified expressly, or may include inherent elements of the process, method, object, or apparatus. Without more limitations, elements defined in a sentence "including one" does not exclude that there are still other same elements in the process, method, object, or apparatus.

Through the descriptions of the foregoing implementations, a person skilled in the art may clearly understand that the method according to the foregoing embodiments may be implemented by means of software and a necessary general hardware platform, and certainly, may also be implemented by hardware, but in many cases, the former manner is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a base station, or the like) to perform the methods described in the embodiments of the present disclosure.

The embodiments of the present disclosure are described above with reference to the accompanying drawings, but the present disclosure is not limited to the foregoing specific embodiments, which are merely illustrative rather than limited. Under the inspiration of the present disclosure, a person of ordinary skill in the art can make many forms without departing from the scope of the present disclosure and the protection of the claims, all of which fall within the protection of the present disclosure.

What is claimed is:

1. A downlink control information (DCI) transmission method, comprising:

obtaining a first bit number of first DCI, wherein the first DCI is sidelink downlink control information (SL DCI);

determining a third bit number of the first DCI according to the first bit number and a second bit number of second DCI; and performing transmission of the first DCI according to the third bit number; wherein the second DCI comprises target DCI in Uu DCI corresponding to a first object; and the first object is a Uu cell or carrier for transmission of the first DCI.

2. The method according to claim 1, wherein the first DCI meets at least one of following:

a number of bit numbers of the first DCI and third DCI is less than or equal to M1, M1 being a positive integer, and the third DCI being the Uu DCI corresponding to the first object, wherein M1 is 4, and the number of bit numbers of the first DCI and the third DCI is less than or equal to 4;

a number of bit numbers of the first DCI and fourth DCI is less than or equal to M2, M2 being a positive integer, and the fourth DCI being dedicated Uu DCI corresponding to the first object; or a number of bit number of the first DCI scheduling the first object is less than or equal to M3, M3 being a positive integer.

3. The method according to claim 1, wherein the second bit number of the second DCI is a bit number of the target DCI corresponding to a target object, and the target object is one of L second objects in the first object, wherein L is a positive integer, and each of the second objects is one of a bandwidth part (BWP), a BWP pair, a cell pair, or a carrier pair.

4. The method according to claim 3, wherein the bit number of the target DCI corresponding to the L second objects comprises at least one of following:

a bit number of the target DCI corresponding to each BWP pair;

a bit number of the target DCI corresponding to each uplink BWP;

a bit number of the target DCI corresponding to each downlink BWP; or a bit number of the target DCI corresponding to each SL BWP;

or the bit number of the target DCI corresponding to the L second objects comprises: a bit number of the target DCI corresponding to each cell pair or carrier pair.

5. The method according to claim 3, wherein the target object is an activated second object in the L second objects; or the target object is any one of following:

a second object corresponding to DCI with a largest or smallest bit number of the target DCI in the L second objects;

a second object comprising most or least resources in the L second objects;

a second object comprising a largest or smallest number of resources in the L second objects;

a second object whose bit number of the target DCI is closest to the first bit number in the L second objects;

a second object whose bit number of the target DCI is larger than the first bit number and closest to the first bit number in the L second objects; or a second object whose bit number of the target DCI is smaller than the first bit number and closest to the first bit number in the L second objects.

6. The method according to claim 3, wherein in a case that the target object is switched or changed, the second bit number is: a bit number of the target DCI corresponding to a target object which is switched or changed; or in a case that at least one sub-object in the target object is switched or changed, the second bit number of the second DCI is: a bit number of the target DCI corresponding to a target object in which a sub-object which is switched or changed is located.

7. The method according to claim 1, wherein the second DCI comprises Q1 pieces of target DCI, Q1 being an integer greater than 1.

8. The method according to claim 7, wherein the determining the third bit number of the first DCI according to the first bit number of the first DCI and the second bit number of second DCI comprises:

obtaining the third bit number based on alignment between the first DCI and fifth DCI, wherein the fifth DCI is first or last target DCI in Q2 pieces of target DCI arranged according to the bit number of the target DCI from large to small, and the Q2 pieces of target DCI are part or all of the Q1 pieces of target DCI.

9. The method according to claim 8, wherein the Q2 pieces of target DCI are target DCI that is not in a first format in the Q1 pieces of target DCI; and/or the third bit number is equal to the second bit number corresponding to the fifth DCI or the first bit number; and/or a bit number of the fifth DCI is equal to the first bit number or the third bit number.

10. The method according to claim 1, wherein the target DCI comprises at least one of following: DCI of user-specific search space, fallback DCI, non-fallback DCI, DCI that is not in a first format, or DCI in a second format.

11. The method according to claim 1, wherein in a case that a network device does not configure the second DCI for a terminal, a behavior of the terminal comprises one of following:

determining that an error occurs on the first DCI;

skipping monitoring the first DCI; or monitoring the first DCI, the third bit number being equal to the first bit number.

12. A communication device, comprising: a memory, a processor, and a computer program stored in the memory and executable on the processor, wherein the computer program, when executed by the processor, causes the communication device to perform:

obtaining a first bit number of first downlink control information (DCI), wherein the first DCI is sidelink downlink control information (SL DCI);

determining a third bit number of the first DCI according to the first bit number and a second bit number of second DCI; and performing transmission of the first DCI according to the third bit number; wherein the second DCI comprises target DCI in Uu DCI corresponding to a first object; and the first object is a Uu cell or carrier for transmission of the first DCI.

13. The communication device according to claim 12, wherein the first DCI meets at least one of following:

a number of bit numbers of the first DCI and third DCI is less than or equal to M1, M1 being a positive integer, and the third DCI being the Uu DCI corresponding to the first object, wherein M1 is 4, and the number of bit numbers of the first DCI and the third DCI is less than or equal to 4;

a number of bit numbers of the first DCI and fourth DCI is less than or equal to M2, M2 being a positive integer, and the fourth DCI being dedicated Uu DCI corresponding to the first object; or a number of bit number of the first DCI scheduling the first object is less than or equal to M3, M3 being a positive integer.

14. The communication device according to claim 12, wherein the second bit number of the second DCI is a bit number of the target DCI corresponding to a target object, and the target object is one of L second objects in the first object, wherein L is a positive integer, and each of the second objects is one of a bandwidth part (BWP), a BWP pair, a cell pair, or a carrier pair.

15. The communication device according to claim 12, wherein in a case that a network device does not configure the second DCI for a terminal, a behavior of the terminal comprises one of following:

determining that an error occurs on the first DCI;

skipping monitoring the first DCI; or monitoring the first DCI, the third bit number being equal to the first bit number.

16. A non-transitory computer-readable storage medium, storing a computer program, wherein the computer program, when executed by a processor of a terminal, causes the terminal to perform:

obtaining a first bit number of first down control information (DCI), wherein the first DCI is sidelink downlink control information (SL DCI);

determining a third bit number of the first DCI according to the first bit number and a second bit number of second DCI; and performing transmission of the first DCI according to the third bit number; wherein the second DCI comprises target DCI in Uu DCI corresponding to a first object; and the first object is a Uu cell or carrier for transmission of the first DCI.

17. The method according to claim 1, wherein the bit number of the target DCI is larger than the first bit number and closest to the first bit number.

18. The communication device according to claim 12, wherein the bit number of the target DCI is larger than the first bit number and closest to the first bit number.

19. The non-transitory computer-readable storage medium according to claim 16, wherein the bit number of the target DCI is larger than the first bit number and closest to the first bit number.

* * * * *